Sept. 22, 1959 F. KHOL ET AL 2,905,046
APPARATUS FOR DETERMINING THE OPTICAL DENSITY OF SHEET
MATERIALS, AND PARTICULARLY FOR INDICATING THE
PHOTOMETRIC CURVE OF X-RAY PHOTOGRAPHS
AND OTHER IMAGES
Filed Nov. 21, 1955
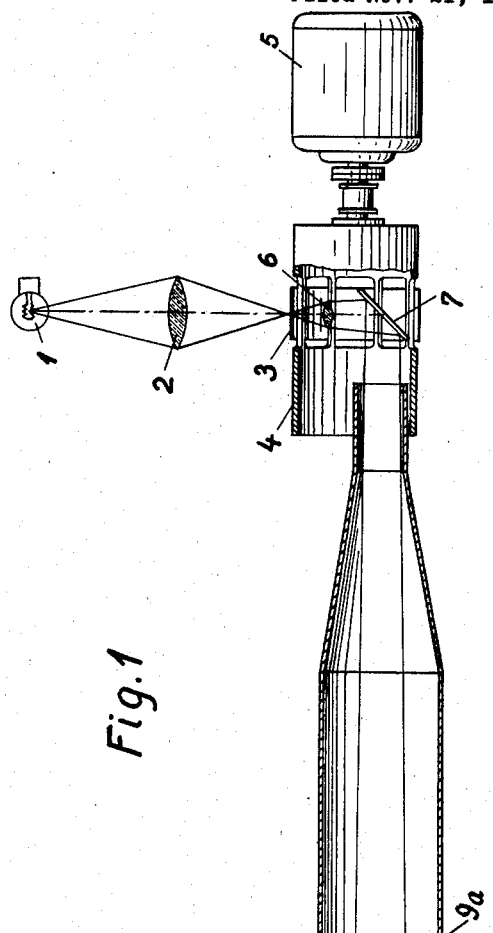
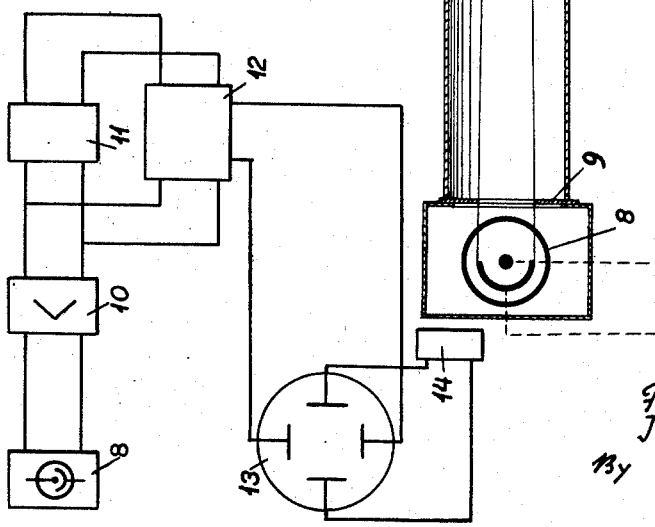
INVENTORS
František Khol
Jan Silhánek

2,905,046

APPARATUS FOR DETERMINING THE OPTICAL DENSITY OF SHEET MATERIALS, AND PARTICULARLY FOR INDICATING THE PHOTOMETRIC CURVE OF X-RAY PHOTOGRAPHS AND OTHER IMAGES

František Khol, Lysa n/Labem, and Jan Šilhánek, Ul. Maxima Gorkeho, Czechoslovakia Application November 21, 1955, Serial No. 548,147

Claims priority, application Czechoslovakia November 22, 1954

2 Claims. (Cl. 88—14)

This invention relates to an improved apparatus for determining the optical density of sheet materials, and more particularly for instantaneously indicating on an oscilloscope screen the photometric curve of X-ray photographs of the fine structure of matter, spectrograms and other images.

Various methods and devices have been proposed and used for the measurement of photographic blackening and for the indication of photometric curves which enable the qualitative and quantitative evaluation and interpretation of X-ray microphotographs of the fine structure of matter, as well as the evaluation of images obtained by optical and X-ray spectrographic analysis of various astronomical images and the like. In general, such measurement has been carried out by means of visual or photoelectric microphotometers and, more recently, by a recording microphotometer with a mechanical recorder. In addition, a device has been developed and used for the determination of distances between difffused diffraction lines in the spots where the photographic density reaches its maximum or minimum and which are determined by differentiating the photometric curve in a mechanical way. In this device, the measuring beam of light is reflected from a periodically-oscillating mirror, and when passing through the spot where the photographic density changes, it produces, in the rhythm of the oscillating mirror, alternating components which are received by a photocell and converted into electrical currents, the voltages of which are amplified and measured by an A.C. voltmeter.

However, all the foregoing methods of recording the photometric curve are time wasting, since the recording operation requires a time of many minutes up to several hours, according to the kind of the image being examined.

It is therefore the main object of the present invention to provide a more convenient method of measuring the photographic density and a suitable apparatus for instantaneously indicating a complete photometric curve of X-ray photographs, spectrograms and other images produced for the purpose of examining the structure and composition of matter.

In carrying out the process of this invention the complete photometric curve appears instantaneously on the screen of an oscilloscope, and can be photographically reproduced for a permanent record. When electrically differentiated, the photometric curve enables, even without being reproduced, a rapid and simple measurement of the photographic density and of the distances between particular lines, especially between diffused lines in the image.

In principle, the X-ray photograph, spectrogram or other object to be examined is wrapped around a cylindrical surface and is turned around the axis of such surface at a constant speed. During its rotation, a beam of light from an outside source is directed onto the subject being examined. The portion of light passing through the object is converted by a conventional photoelectric device, for example, a photocell, into electric current or voltage proportional to the rate of light received by the photocell. The developed current or voltage is amplified and conducted, on the one hand, to a differentiating device, and, on the other hand, through a mechanical or electrical change-over switch to the vertical deflectors of an oscilloscope. The frequency of the change-over switch operation is in a certain ratio to the speed of rotation of the object under examination. Such ratio must be determined by whole numbers, preferably small ones, for example, 1:1, 1:2, 2:1, in order to obtain an immovable picture on the screen.

In the differentiating device, impulses are derived from the inlet voltage at the maxima of the optical density and are also conducted through the change-over switch to the vertical deflectors of the oscilloscope.

The differentiating device first performs the differentiation of the inlet voltage in the CR-member (consisting of capacity and resistance). The voltages are amplified, then bilaterally limited, that is, cut-off in their positive and negative values near zero, and again differentiated in order to produce impulses at the maxima and minima of optical density. The impulses at the minima are cancelled out by a further limitation of the voltage, and there remain only impulses at the maxima.

The horizontal deflectors of the oscilloscope are connected with a source of sawtooth or sinusoidal voltage or current the frequency of which may, but need not, be identical with the frequency of the change-over-switching operation and corresponds to the rotation speed of the object under examination in a ratio expressed by whole, preferably small numbers, that is necessary for obtaining an immovable picture on the screen. Thus, for example, a voltage or current of a frequency of 50 cycles p.s. corresponds to the rotation speed of 3000 r.p.m. (equalling 50 revolutions per second) in the ratio of 1:1. This arrangement enables the photometric curve to be observed simultaneously with the marks on the screen indicating the spots of the maximum photographic density on an X-ray photograph or a spectrogram under examination.

The equipment designed in accordance with the invention comprises a rotating cylinder which enables light to pass through the X-ray photograph, spectrogram or other object under examination that is fixed to the outer surface of the cylinder and covers preferably one-half of its circumference. Light coming from a steady source illuminates the object being examined. The portion of light passing through this object is directed by an optical system onto a photocell located preferably in the proximity of and perpendicularly to the axis of the cylinder.

The illuminated area of the object under examination is reproduced in the plane of the photocell in a certain ratio of magnification given by the optical means that are employed.

If the cylinder is made of an opaque material it must be hollow and provided with light admitting apertures around that part of its length where the object to be examined is secured.

A sliding partition-wall is preferably arranged immediately in front of the photocell to open an adjustable slot which allows a controlled portion of the luminous flux to pass therethrough for reproducing on the photocell a confined area of the object being examined. The same result can be obtained by using a diaphragm instead of the partition-wall. The size of the area reproduced on the photocell corresponds to the size of the slot or to the opening of the diaphragm respectively, and to the rate of the optical magnification employed.

Fuller understanding of this invention may be had by referring to the following description of a preferred embodiment considered in conjunction with the accompanying drawings in which:

Fig. 1 is a diagrammatic cross-sectional view of the apparatus in more or less schematic form, and Fig. 2 is a diagram of the electrical circuits used with the embodiment shown in the Fig. 1.

Light from a source 1, for example, a bulb, discharge tube and the like, is focused by a lens 2 onto an X-ray photograph, spectogram or other object 3 under examination which is fixed on a hollow rotating cylinder 4 in which apertures are provided for enabling light to pass therethrough. The cylinder is driven by a small synchronous electric motor 5 running at 3000 r.p.m. Light passing through the object under examination is refracted by a lens 6 within the cylinder 4 and is reflected by a mirror 7 through a light confining member 9, for example, sliding partition-wall or a diaphragm, onto a photocell 8. Disturbing influence or interference of stray light in the working room is avoided by the covering member 9a which is connected with the light confining member 9.

The illuminated area of the object under examination is reproduced at a suitable ratio of magnification, for example, 20:1, in the plane extending through the photocell perpendicular to the axis of the cylinder 4. Light passing through the slot of member 9 represents a stripe on the object being examined; the width of this stripe being determined by the opening of the slot and by the optical magnification employed.

Voltage developed in the working resistance of the photocell 8 is amplified by an alternating amplifier 10 (Fig. 2). The output of the amplifier is conducted, on the one hand, into a differentiating device 11 for producing impulses at the maxima of the photometric curve and, on the other hand, to a change-over switch 12 having a frequency of 25 c.p.s. which, in addition, takes over impulses from the differentiating device 11. Both the voltage developed by the amplifier 10 and the impulses produced by the differentiating device 11 are conducted through the change-over switch 12 to the vertical deflectors of an oscilloscope 13. The horizontal deflectors of the same oscilloscope have a voltage of sawtooth or sinusoidal wave shape developed in a time base generator 14 applied thereto.

By using the recording photometer with a differentiating device as disclosed in the foregoing description and embodying the present invention, it is possible to carry out analysis of the structure of spectrum lines and interpret X-ray photographs of the fine structure of matter, spectrograms and similar images. The image under examination can be sufficiently magnified both in horizontal and vertical directions so as to enable even a single line to be observed. It is possible to read on a scale before the screen of the oscilloscope the optical density of particular lines and of the background. The distances between the lines can be determined by the marks corresponding to maxima of optical density, that is, to the peaks of the photometric curve. In order to facilitate the measurement of the distances, it is possible to place on one-half of the circumference of cylinder 4, precisely opposite the half covered by the image to be examined, a film calibrated with a millimetric scale. Thus it is possible, by using a sinusoidal time base of 50 c.p.s. or a sawtooth time base of 100 c.p.s., to obtain over the image under examination further impulses corresponding to 1 millimeter. The invention makes it possible, at the same time, to compare and interpret a series of images whose photometric curves appear simultaneously on the screen and differ from each other, for example, by merely a single line.

The method and apparatus according to the present invention is intended also for measuring optical density of various kinds of sheet materials, for example, of paper, films, metal foils or the like in laboratories and testing plants and for the technical inspection of manufacturing processes in industrial plants.

Although the present invention has been described with a certain degree of particularity, it is to be understood that the present disclosure has been made only by way of example and that numerous changes in the details of construction and the combination and arrangement of parts may be resorted to without departing from the spirit and scope of the invention and hereinafter claimed.

The nature and objects of the present invention having thus been set forth and a specific embodiment of the same illustrated, what is claimed as new and useful and desired to be protected by Letters Patent is:

1. Apparatus for determining the optical density of objects of translucent sheet materials and, particularly, for instantaneously indicating the photometric curve of X-ray photographs of the fine structure of matter, spectrograms and the like; comprising a hollow cylinder rotatable about its longitudinal axis and having means arranged around the circumference of the cylinder for a portion of the length thereof to permit light to pass radially therethrough, said cylinder being adapted to have an object to be examined fixed thereon at said portion of the length of the cylinder, means for rotating said cylinder at a constant speed, means focusing a beam of light against said portion of the cylinder to pass through an object fixed on the latter, an optical system for transmitting light from said beam through an object on the cylinder into the interior of the latter, a light confining member positioned in the path of the light transmitted by said optical system, an electrically responsive photosensitive element positioned to receive light passing through said light confining member, means amplifying the voltage developed by said photo-sensitive element, conducting means extending from the output of said amplifying means and dividing the amplified voltage from the latter into first and second branches, an oscilloscope having vertical and horizontal deflectors, a periodically operating change-over switch interposed between said first and second branches and said vertical deflectors to intermittently connect the latter alternately to said first and second branches at a frequency synchronized with the rotational speed of said cylinder having an object fixed thereon, a differentiating device interposed in said second branch between said amplifying means and said change-over switch and operative first to differentiate the amplified voltage of said second branch, then to cut-off the differentiated voltage in its positive and negative values near zero, then to perform a second differentiation of the cut-off voltage and finally to eliminate the positive values of voltage obtained from the second differentiation, a source of voltage of sawtooth wave shape having a frequency which is synchronized with the rotational speed of said cylinder, and means applying the sawtooth voltage from said source to said horizontal deflectors of the oscilloscope.

2. Apparatus for determining the optical density of objects of translucent sheet materials and, particularly, for instantaneously indicating the photometric curve of X-ray photographs of the fine structure of matter, spectrograms and the like; comprising a hollow cylinder rotatable about its longitudinal axis and having means arranged around the circumference of the cylinder for a portion of the length thereof to permit light to pass radially therethrough, said cylinder being adapted to have an object to be examined fixed thereon at said portion of the length of the cylinder, means for rotating said cylinder at a constant speed, means focusing a beam of light against said portion of the cylinder to pass through an object fixed on the latter, an optical system for transmitting the light from said beam which passes through an object on the cylinder into the interior of the latter, a light confining member positioned in the path of the light transmitted by said optical system, an electrically responsive photo-sensitive element positioned to receive light passing through said light confining member, means amplifying the voltage developed by said photo-sensitive element, conducting means extending from the output of said amplifying means and dividing the amplified voltage from the latter into first and second branches, an oscilloscope having vertical and horizontal deflectors, a periodically operating change-over switch interposed between said first and second branches and said vertical deflectors to intermittently connect the latter alternately to said first and second branches at a frequency synchronized with the rotational speed of said cylinder having an object fixed thereon, a differentiating device interposed in said second branch between said amplifying means and said change-over switch and operative first to differentiate the amplified voltage of said second branch, then to cut-off the differentiated voltage in its positive and negative values to a constant value near zero, to perform a second differentiation of the resulting voltage and to eliminate the positive values of voltage obtained from the second differentiation and corresponding to the impulses at the minima of photographic density, so that only the impulses corresponding to the maxima of photographic density remain for feeding to said vertical deflectors, means generating a voltage of sawtooth wave shape at a frequency which is synchronized with the rotational speed of said cylinder, and means applying the sawtooth voltage to said horizontal deflectors of the oscilloscope.

References Cited in the file of this patent

UNITED STATES PATENTS

| | | |
|---|---|---|
| 1,991,599 | Davis | Feb. 19, 1935 |
| 2,234,697 | Hickman | Mar. 11, 1941 |
| 2,361,447 | Baker | Oct. 31, 1944 |
| 2,645,971 | Herbst | July 21, 1953 |
| 2,648,723 | Goldsmith | Aug. 11, 1953 |
| 2,680,200 | Hercock | June 1, 1954 |
| 2,719,235 | Emerson | Sept. 27, 1955 |
| 2,794,361 | Shaffer | June 4, 1957 |